United States Patent [19]

Becktel et al.

[11] 4,328,844
[45] May 11, 1982

[54] PRESSURE FUELING ADAPTER

[75] Inventors: Robert L. Becktel, Laguna Niguel, Calif.; Robert P. Greenwell, Mercer Island, Wash.; Basil B. Tilling, Mission Viejo, Calif.

[73] Assignee: Parker-Hannifin Corporation, Cleveland, Ohio

[21] Appl. No.: 125,003

[22] Filed: Feb. 27, 1980

[51] Int. Cl.³ .......................... B65B 3/04; F16L 79/00
[52] U.S. Cl. ..................................... 141/302; 137/613; 137/614.11; 141/346; 244/135 A
[58] Field of Search ........................ 137/613, 614.11; 141/198, 301, 302, 346–350; 244/135 A

[56] References Cited
U.S. PATENT DOCUMENTS
3,976,100 8/1976 Souslin .......................... 141/346 X Primary Examiner—Frederick R. Schmidt
Attorney, Agent, or Firm—Joseph B. Balazs

[57] ABSTRACT

A pressure fueling adapter for aircraft has spring loaded primary and secondary nested poppets for controlling fluid flow therethrough, the primary poppet operable by engagement with the position lever of a fuel nozzle and the secondary poppet responsive to pressure differentials to allow inlet fluid flow and check back flow. A cam interengagement mechanism may be manually actuated to connect the primary and secondary poppets for simultaneous movement by the position lever of the fuel nozzle to defeat the secondary poppet check, for defueling purposes.

21 Claims, 6 Drawing Figures

PRESSURE FUELING ADAPTER

BACKGROUND OF THE INVENTION

This invention relates to aircraft fueling systems and more particularly to an adapter for connection between the aircraft and a nozzle for fueling or defueling same. The adapter includes valving therein to limit reverse fluid flow and to provide a dry break capability.

Prior art adapters are known for coupling between aircraft fuel systems and fueling nozzles but these devices have limitations in that a certain amount of spillage occurs due to the quantity of fuel trapped within the adapter housing and that secondary shutoff valves are required in the aircraft. Further some of these devices may include a defuel lever between the primary poppet and the fueling nozzle which can be engaged during coupling of the nozzle causing premature opening of the fuel path.

SUMMARY OF THE INVENTION

The adapter of this invention alleviates many of these problems in having primary and secondary poppets for controlling fluid flow and an improved latching mechanism therebetween which allows nozzles to be attached for defueling without any significant spillage and without secondary shutoff valves in the aircraft. The secondary poppet which is outside the primary poppet acts as a reverse flow check valve in the event of reverse pressure differential and is opened by inlet flow momentum forces. In the defuel mode, the poppets are locked together by a pair of spring-loaded pins which are moved into locking engagement by a cam integral with the primary poppet assembly and accessible from the inlet port. Lifting of the primary poppet by the position lever of the fuel nozzle, thus also lifts the secondary poppet to open the defuel path. The primary and secondary poppets comprise an assembly which may be removed from the housing as a unit for repairs or replacement purposes. A separate inlet adapter flange is provided and may be removed as well from the housing without disturbing the primary adapter seal.

DETAILED DESCRIPTION OF THE DRAWINGS

Figure 1:
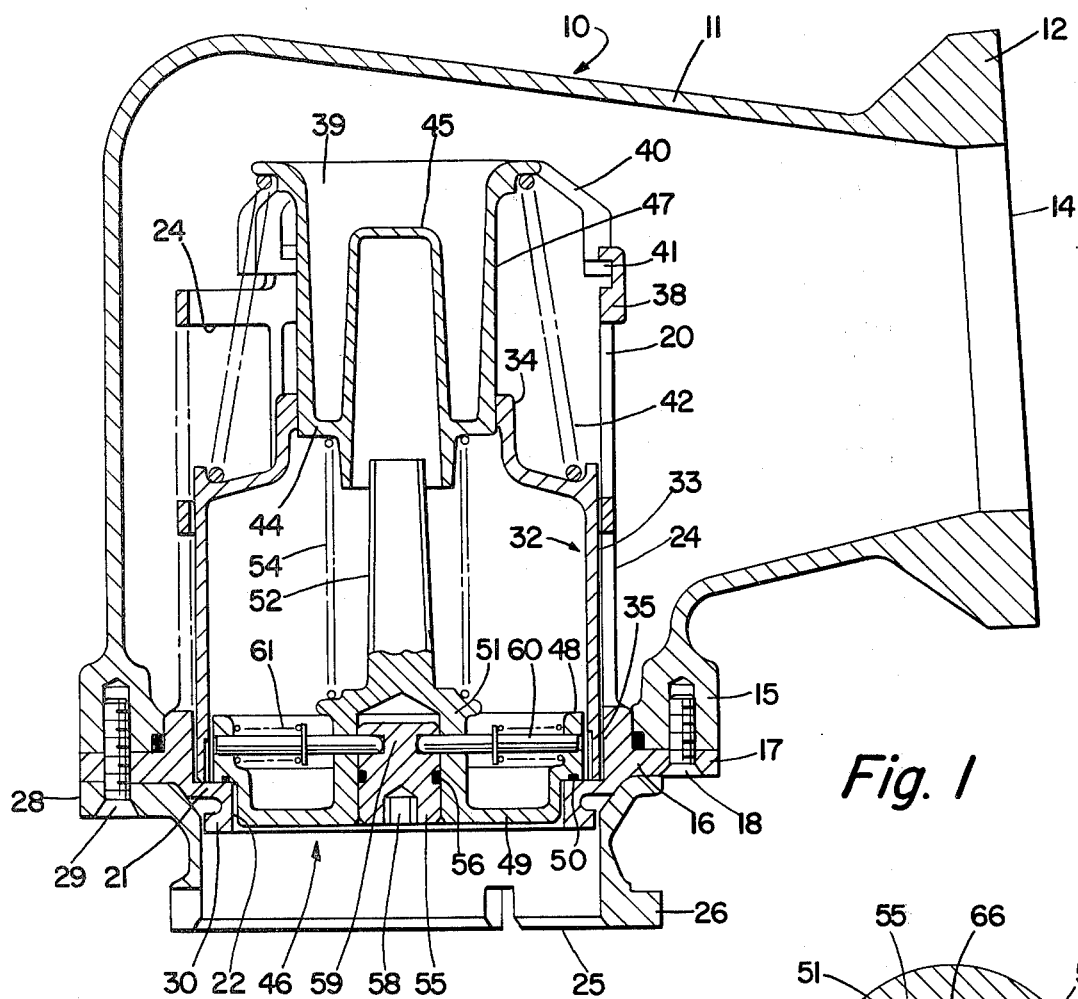
FIG. 1 is an elevation view of the adapter in cross section, showing the adapter in the closed position.

Referring now to FIG. 1 the adapter 10 comprises a generally elbow-shaped housing 11 having a necked-down opening at one end terminating in flange 12, forming an outlet port 14, and an annular inlet opening formed by the enlarged boss 15. A generally tubular valve seat structure 16 has annular seat flange 17 secured to boss 15 by screws 18; the tubular guide portion 20, extending within the housing 11; and an inward annular step 21, the upper surface thereof forming the valve seat. The step 21 terminates in an inner cylindrical surface 22, forming the inlet port for the adapter housing 11. Guide portion 20 is apertured about its periphery as at 24 and is disposed in the fuel path between the inlet port 22 and outlet port 14.

A generally tubular nozzle adapter 25 has flange 26 thereon for engagement with locking lugs of a fueling nozzle (not shown) which may supply fuel under pressure for fueling of the aircraft through adapter 11 or may serve as a conduit for defueling purposes. Nozzle adapter 25 includes radial flange 28 thereon for seating against seat flange 17, to be retained with boss 15 by means of screws 29, providing a loose fit within lip 30 of seat structure 16. Thus, adapter flange 25 may be removed from housing 11, by means of release of screws 29, without disturbing the remainder of the structure comprising the adapter 10.

The secondary poppet 32 includes tubular portion 33 and necked-down sliding support ring 34 at the upper end. The tubular portion 33 includes annular recess 35 at the lowermost inner periphery thereof. Tubular portion 33 is sized for a sliding fit within guide portion 20 of the seat structure 16 and in the lowermost position, as seen in FIG. 1, rests upon valve seat ledge 21, forming a seal with the valve seat 21 and the non-apertured inner periphery of the lower portion of tubular guide 20.

At several circumferential locations in its upper portion, guide 20 includes arcuate notched retaining members 38 forming one-half of bayonet-type interconnections with central poppet guide 39. Guide 39 is generally of tubular shape having at one end, several depending legs 40 which support at their lowermost ends, radially extending arcuate flanges 41, which comprise the mating half of the bayonet interconnection. Poppet guide 39 may thus be placed in location within valve seat guide 20 and angularly rotated until flanges 41 enter the notches in the retaining members 38, thereby trapping the poppet guide 39. A conical spring 42 retained beneath the depending legs 40 and the transverse wall connecting poppet wall portion 33 and support ring 34, urges poppet guide 39 upwardly and retains flanges 41 in engagement with retaining members 38.

Poppet guide 39 further includes closed transverse bottom wall 44 having a central recessed guide portion 45, the latter having a bore therein. The outer wall 47 of poppet guide 39 is cylindrical and provides a sealing surface for sliding support ring 34.

A primary poppet assembly 46 comprises a cup-like member having an outer tubular wall 48, a reduced diameter, closed transverse end wall 49, and an intermediate transverse wall therebetween, the latter supporting an annular seal 50 adapted to seat upon valve seat 21. The reduced end wall 49 of the poppet assembly 46 is sized for sliding fit in inlet port 22 and the end wall 49 further includes a central cylindrical support 51 having upwardly extending, tapered triple-flute guide section 52 adapted for interengagement with the bore of guide portion 45 of poppet guide 39, upon upward movement of primary poppet assembly 46. A compression spring 54 biases poppet guide 39 upwardly and primary poppet assembly 46 downwardly, urging seal 50 against valve seat 21.

Centrally disposed in a bore in support 51 is cylindrical plug 55, having peripheral o-ring seal 56, hexagonal socket 58 in the lower face, and a cam 59 near the upper end thereof. A pair of pins 60 are supported in radially aligned apertures in central support 51 and outer wall 48 and are urged by means of springs 61 to a radially inward position in engagement with cam 59.

Figure 3:
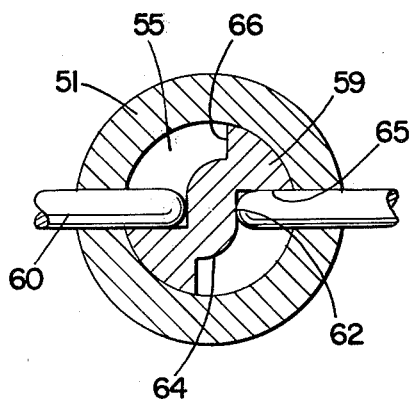
FIG. 3 is an enlarged sectional view of the defuel cam and portions of the locking pins, taken approximately at the line of the pins.
Figure 2:
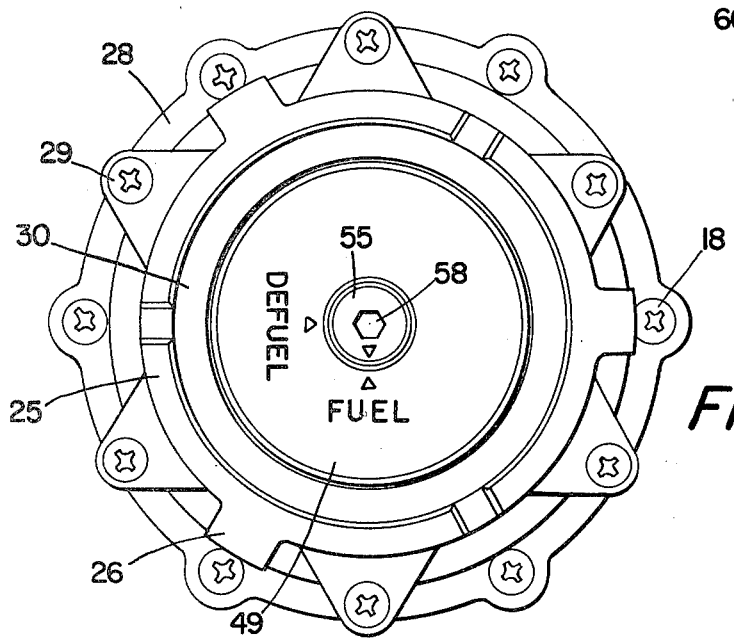
FIG. 2 is a bottom view of the adapter showing the defuel cam.
Figure 6:
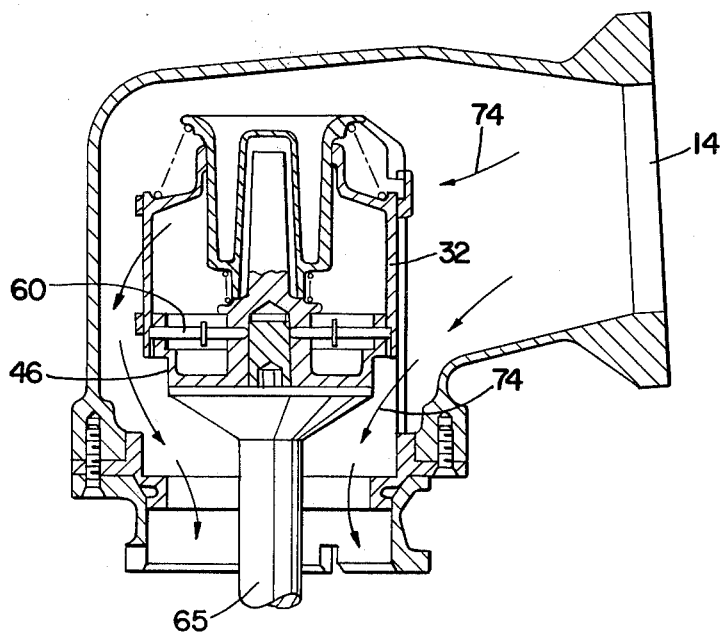
FIG. 6 is a view similar to that of FIG. 4 showing the adapter in the defuel mode.

As seen more clearly in FIG. 3 cam 59 is integral with plug 55 and comprises a symmetrical cam having radial inner lobes 62, outer lobes 64, smooth transition surfaces therebetween and respective stop walls 65, 66. In FIG. 3, cam 59 is in a clockwise position with pins 60 in engagement with inner lobes 62 and stop walls 65, in which location the outer ends of pins 60 do not protrude radially outwardly of poppet outer wall 48. Upon counterclockwise rotation of cam 59 to a position where pins 60 engage outer lobes 64 and stop walls 66, the outer ends of pins 60 will protrude beyond poppet outer wall 48 into the recess 35 in secondary poppet 32, as seen in FIG. 6.

The adapter 10 is shown in closed position in FIG. 1. In such position both primary poppet 46 and secondary poppet 32 are biased to a closed position, the former sealing at seal 50 and the latter at seat structure 16 at the lower end, and at support ring 34, at the upper end. The poppets 46, 32 are biased to such positions by springs 54, 42, respectively and by any fluid in housing 11 under any pressure exceeding that beyond inlet port 22. In normal operation adapter 10 is connected to an aircraft fuel system at flange 12 providing communication through outlet port 14. With the apparatus of this invention such aircraft fuel system includes internal valving and fluid under pressure will normally occur in housing 11.

The close spacing between outer wall 48 of primary poppet 46 and the inner periphery of secondary poppet 32 provides a guide for upward movement of the primary poppet 46 as well as a predetermined fluid flow area. A second predetermined flow area smaller than the first, is established between guide ring 34, at the upper end of the secondary poppet 32 and the external periphery of poppet guide 39.

Figure 4:
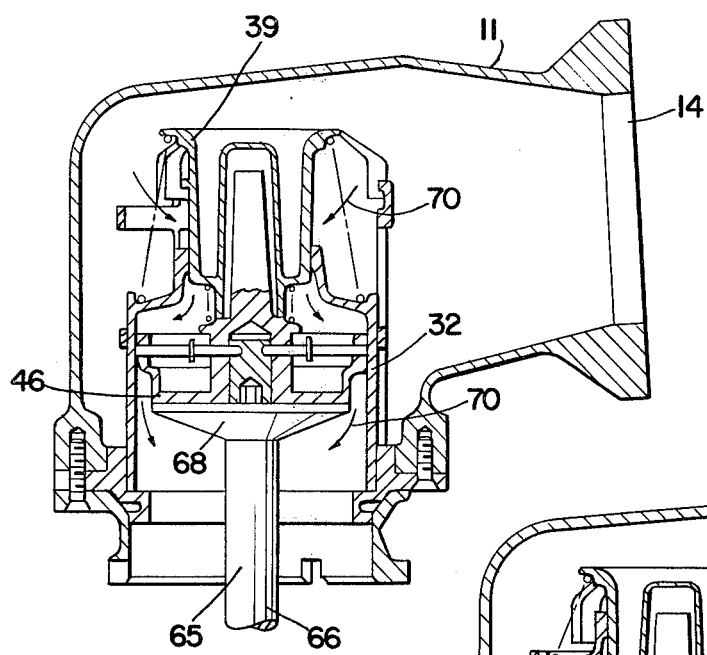
FIG. 4 is a view of the adapter similar to that of FIG. 1, showing the adapter in the reverse flow check position.
Figure 5:
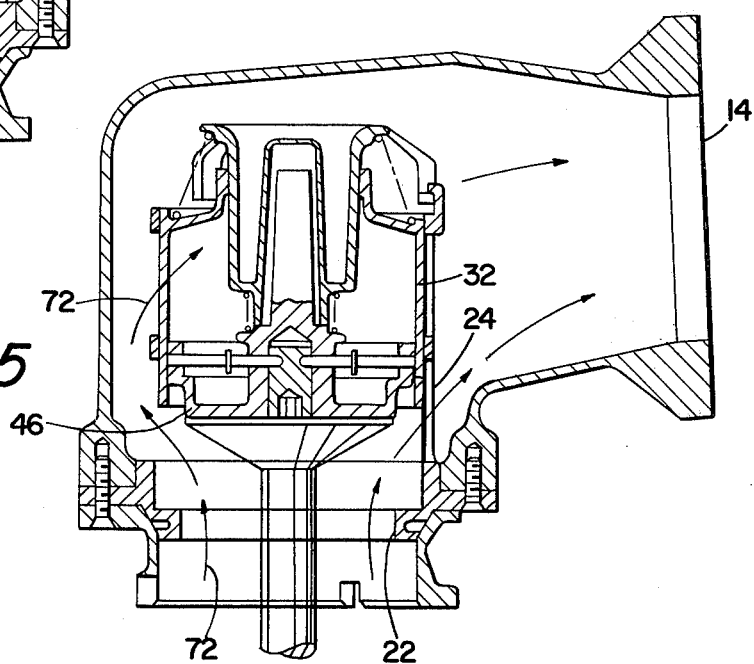
FIG. 5 is a view similar to that of FIG. 4 showing the adapter in the fueling mode.

In a typical fueling mode as shown in FIGS. 4 and 5 a fueling nozzle (not shown) is connected to nozzle adapter 25 and temporarily secured by means of locking lugs which engage flange 26. A fueling nozzle includes a nozzle piston 65 thereon, the flat upper face of which engages transverse wall 49 of primary poppet 46. With a nozzle secured to adapter 25, a nozzle lever is actuated to raise nozzle piston 65 and primary poppet 46 therewith to the position depicted in FIG. 4, with annular seal 50 separated from valve seat 21. During lifting movement guide section 52 has entered the bore of poppet guide 39 to provide guiding support for the upper end of the primary poppet 46.

In such fueling mode, but prior to application of fuel through the nozzle and into the inlet port 22, or subsequent to a fueling operation when a valve in the fueling nozzle is closed, no fuel under pressure will be present in the inlet port 22. Secondary poppet 32 will be biased against valve seat 21 under urging of spring 42. If fuel under pressure is within housing 11 at outlet port 14, such fluid pressure differential will further urge secondary poppet 32 in a downward direction, providing a check-valve function. A path of minimal fluid flow may occur as depicted by the arrows 70 between support ring 34 and guide surface 47 and between outer wall 48 of the primary poppet 46 and the inner periphery of the secondary poppet 32. This flow is typically maximized at about 3 GPM with selection of finishes and clearances at these locations.

The problem of unloading the nozzle piston during the fueling cycle, which is the highest life cycle mode of operation is eliminated. By utilizing the secondary poppet 32 for reverse flow checking, the primary poppet 46 can remain at rest, spring loaded against the nozzle piston 65, which precludes chattering of its actuating mechanism.

In the fueling mode, depicted in FIG. 5, with nozzle engaged and activated to an open position, nozzle piston 65 raises primary poppet 46, as described previously. The primary poppet 46 then remains at rest during the fueling process, when fuel under pressure is applied at inlet port 22. The flow area between primary poppet outer wall 48 and secondary poppet 32 inner periphery is sized larger than the flow area between support ring 34 and guide surface 47 to provide a build up of pressure within the secondary poppet 32. Thus, fuel pressure and velocity forces acting on the effective area of the secondary poppet 32, raise it against the force of bias spring 42 to open the flow path depicted by arrows 72. Such flow path is through inlet port 22, beneath lower edge of secondary poppet 32, through apertures 24 in seat structure 20, to outlet port 14. The secondary poppet 32 positions itself where a force balance is obtained between the fuel velocity force and the bias of spring 42. When fueling is discontinued, the secondary poppet 32 will return to rest on valve seat 21 and again act as a reverse flow leakage limiter.

With actuation of the nozzle to the closed position, nozzle piston 65 is retracted and the primary poppet 46 follows until again seated on the valve seat 21. The volume of fuel trapped between the adapter 10 and nozzle is minimal in this design due to the lack of intermediate structure.

The defuel mode is depicted in FIG. 6 and in this mode, prior to coupling of the nozzle, defuel cam 59 is rotated 90° in a counterclockwise direction to extend pins 60 into the recess 35 in the secondary poppet 32. With engagement of the nozzle and actuation to an open position nozzle piston 65 will lift both the primary poppet 46 and secondary poppet 32 to the positions indicated. A flow path will be established, as shown by arrows 74, in a direction reverse to that depicted by arrows 72 in FIG. 5. In this defueling mode, secondary poppet 32 will be defeated from its check valve function by the latching engagement with primary poppet 46, provided by pins 60. Upon completion of defueling, closure of the nozzle will lower nozzle piston 65 and reseat primary poppet 46 on valve seat 21, before disengagement of the nozzle can be accomplished.

What we claim is:

1. An aircraft fueling adapter, comprising
 a housing having inlet and outlet ports,
 a valve seat in said housing between said inlet and outlet ports, said valve seat being annular and disposed closely adjacent said inlet port,
 primary and secondary poppets movable toward and away from said valve seat for closing and opening the path for fluid flow between said inlet and outlet ports, said primary poppet being generally cylindrical and having a sealing portion cooperable with said valve seat, said primary poppet being slidable within said secondary poppet and being disposed near said inlet port and operable to an open position to apply fluid pressure from said inlet port to said secondary poppet, said secondary poppet being disposed between said primary poppet and said outlet port, and means biasing said poppets toward said valve seat to close the path for fluid flow, said secondary poppet being an annular check valve operable to open in response to fluid pressure at said inlet port, said secondary poppet having an inner periphery closely adjacent said primary poppet for guiding the latter toward and away from said valve seat.

2. The adapter set forth in claim 1 wherein said valve seat is annular, said secondary poppet is annular and said primary poppet is disposed within said secondary poppet.

3. The adapter set forth in claim 2 wherein said secondary poppet is tubular having an inner periphery closely adjacent said primary poppet for guiding the latter toward and away from said valve seat.

4. The adapter set forth in claim 1 further including latching means on said primary poppet engageable with said secondary poppet for locking said poppets together for simultaneous movement.

5. A valved adapter for fueling and defueling aircraft, comprising a housing having an outlet port adapted to be coupled to an aircraft and an inlet port adapted for coupling to a fueling nozzle, a valve seat in said housing between said inlet and outlet ports, a first poppet movable toward and away from seating engagement with said valve seat for closing and opening a path for fluid flow through said housing, means biasing said first poppet into engagement with said valve seat, said first poppet adapted for engagement by the fueling nozzle to move said first poppet away from said valve seat to an open position, a second poppet in the fluid path between said first poppet and said outlet port for opening and closing the path for fluid flow through said housing, means biasing said second poppet to a closed position, said second poppet being movable to an open position against said biasing means by fluid under pressure in the fueling nozzle to allow fluid flow from said inlet port to said outlet port, and means for selectively connecting said first and second poppets for combined movement to an open position in response to engagement by said fueling nozzle to provide an open path for fluid flow between said inlet and outlet ports.

6. The adapter set forth in claim 5 wherein said first and second poppets comprise a unitary assembly removable from said housing.

7. The adapter set forth in claim 6 wherein said valve seat is said inlet port for said valved adapter.

8. The adapter set forth in claim 7 wherein said unitary assembly includes a further adapter removably connected therewith, for coupling to the fueling nozzle.

9. The adapter set forth in claim 5 wherein said connecting means comprises a cam actuated latch for interengagement between said first and second poppets.

10. The adapter set forth in claim 9 wherein said latch cam is manually actuatable and is housed in said first poppet for movement therewith.

11. The adapter set forth in claim 10 wherein said connecting means further comprises a pair of pins supported in said first poppet for sliding movement outwardly thereof and spring means biasing said pins inwardly against said latch cam, said latch cam being rotatable to extend said pins outwardly.

12. The adapter set forth in claim 5 wherein said valve seat is annular, said first poppet is generally cylindrical having a lower force adapted to engage said valve seat, and said second poppet is generally tubular and adapted to slide over said first poppet.

13. The adapter set forth in claim 12 wherein said valve seat further comprises an apertured tubular guide portion for externally guiding movement of said second poppet and a central cylindrical structure for internally guiding movement of said second poppet.

14. The adapter set forth in claim 13 wherein said central cylindrical structure comprises an extended valve seat and said remote end of said second poppet is in slidable sealed engagement therewith.

15. The adapter set forth in claim 13 wherein said central cylindrical structure comprises a hollow internal guide portion adapted to cooperate with said first poppet upon relative movement therewith, for guiding said first poppet.

16. The adapter set forth in claim 13 further including a bayonet interconnection between said tubular guide portion and said central cylindrical guide structure.

17. A valved adapter for interconnection between an aircraft fuel system and a fuel nozzle, comprising a housing having an inlet and outlet, a valve seat structure mounted at the inlet of said housing, said seat structure comprising an annular valve seat and a tubular support section extending within said housing, a tubular secondary poppet adapted for sliding movement within said tubular support section, a generally cylindrical guide member releasably interengaged with said support section, said secondary poppet adapted for sliding, sealed engagement with said guide member, spring means between said guide member and said secondary poppet for urging the latter into sealing engagement with valve seat structure, a primary poppet assembly comprising a closed end tubular poppet having a lower face adapted to seat upon said valve seat, a side wall adapted for sliding movement within said tubular support section, an upwardly-extending central guide member adapted for interengagement with said cylindrical guide member, and second spring means acting between said cylindrical guide member and said primary poppet assembly for urging said lower face against said valve seat.

18. The adapter set forth in claim 17 further comprising a latch for securing said secondary poppet for movement with said primary poppet assembly.

19. The adapter set forth in claim 18 wherein said latch comprises spring-loaded radially disposed pins supported in said primary poppet assembly and a rotatable cam for urging said pins outwardly into engagement with said secondary poppet.

20. The adapter set forth in claim 19 wherein said cam is disposed in said lower face of said primary poppet assembly for external access.

21. The adapter set forth in claim 20 further including an adapter flange releasably connected to said housing and in engagement with said valve seat structure, forming an inlet port adapted for connection to a fuel nozzle.

* * * * *